United States Patent [19]

Bean et al.

[11] 3,770,532

[45] Nov. 6, 1973

[54] POROUS BODIES AND METHOD OF MAKING

[75] Inventors: Charles P. Bean, Schenectady; Warren DeSorbo, Ballston Lake, both of N.Y.

[73] Assignee: General Electric Company, Schenectady, N.Y.

[22] Filed: Feb. 16, 1971

[21] Appl. No.: 115,762

Related U.S. Application Data

[63] Continuation of Ser. No. 704,285, Feb. 9, 1968, abandoned.

[52] U.S. Cl.............. 156/7, 250/83 CD, 250/83.1
[51] Int. Cl............................ B29c 17/08, G01t 5/10
[58] Field of Search..................... 156/6, 7, 2, 3, 18; 148/175; 250/83 CD, 83.1; 23/253, 254; 134/27, 28, 29; 29/580, 583

[56] References Cited
UNITED STATES PATENTS

| | | | |
|---|---|---|---|
| 1,642,419 | 9/1927 | Loew | 137/27 |
| 3,131,103 | 4/1964 | Bogue et al. | 156/3 |
| 3,259,461 | 5/1966 | Griffin et al. | 23/253 C |
| 3,303,085 | 2/1967 | Price et al. | 250/83 CD |
| 3,335,278 | 8/1967 | Price et al. | 250/83.1 |
| 3,343,256 | 9/1967 | Smith et al. | 29/580 |
| 3,472,629 | 10/1969 | Rommel et al. | 23/254 |
| 3,415,993 | 10/1968 | Fleisher et al. | 156/3 |
| 3,243,323 | 3/1966 | Corrigan et al. | 148/175 |

*Primary Examiner*—Charles E. Van Horn
*Attorney*—Richard R. Brainard, Paul A. Frank, Jane L. Neuhauser, Oscar B. Waddell and Melvin Goldenberg

[57] ABSTRACT

A process for making tapered holes in a solid material which contains tracks of radiation damaged material is described. One surface of the solid is contacted with an etchant while the opposite surface of the solid is contacted with an agent capable of substantially stopping the etching action of the etchant. Such an agent can be a neutralizer for the etchant or an inert medium. The etchant etches, i.e., extracts, the track-defining radiation damaged material, and upon penetrating through the solid to form a hole, it contacts the neutralizer or inert medium and its etching action is substantially stopped. The product is useful as a filter.

7 Claims, 6 Drawing Figures

PATENTED NOV 6 1973 3,770,532
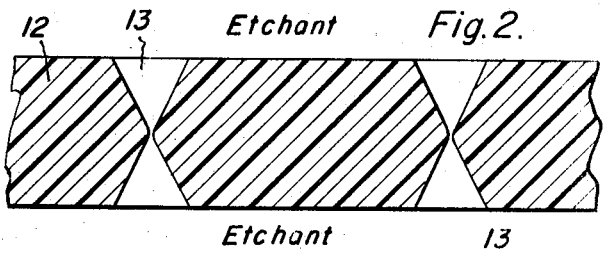
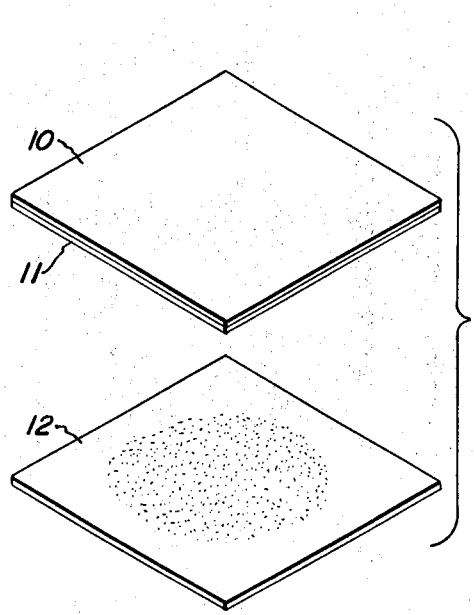
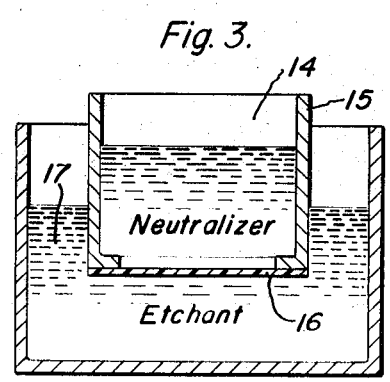
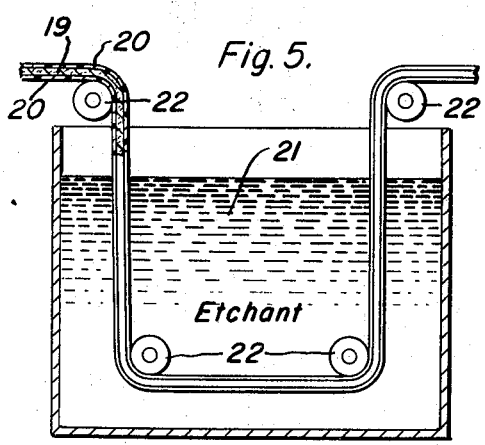
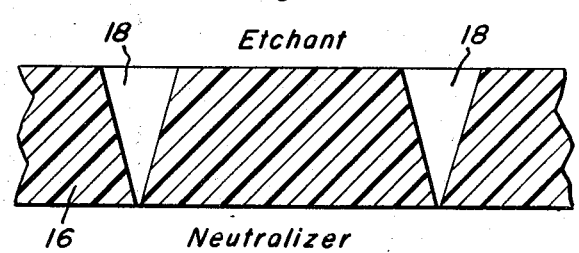
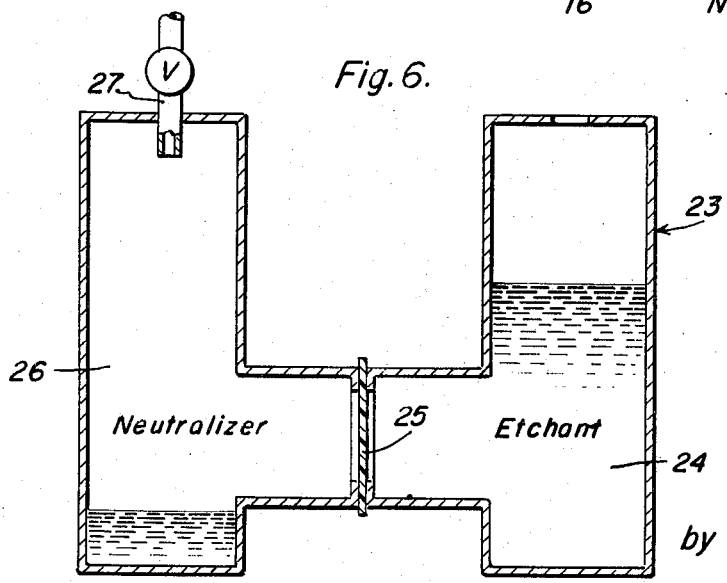
Inventors:
Charles P. Bean;
Warren De Sorbo,
by Jane M. Binkowski
Their Attorney.

POROUS BODIES AND METHOD OF MAKING

This application is a continuation of application Ser. No. 704,285, filed Feb. 9, 1968, and now abandoned.

Porous bodies or filters having a large number of straight-through holes of extremely small diameter and a method of making such porous bodies have been described and claimed in U.S. Pat. No. 3,303,085 — Price et al., Jan. 7, 1967. The method involves a combination of irradiation damage along substantially straight paths and the chemical removal of the damaged material to provide pores or openings. More specifically, the workpiece is subjected to heavy energetic particles to provide the damage track and the damaged material removed by etching as by immersing the workpiece in an acid-etching solution.

While pores formed in this manner are reasonably uniform in diameter throughout their length there is a tendency in a number of materials for a minimum diameter region to be formed intermediate the ends of the openings so that the opening has a somewhat hourglass longitudinal cross section. This is particularly true if the etching is carried out by immersion of the workpiece. The amount of taper varies with different materials and with the etchant employed, but it is sufficient to be undesirable in some applications. For example, if the porous body is used for filtering, such as filtering bacteria or proteins, for example, there is a tendency for filters with a given size opening to clog in use.

In accordance with an important feature of the present invention, the workpiece, which has previously been subjected to radiation to produce the damage tracks, is subjected to an etching solution on one surface, preferably the radiated surface, and the opposite surface subjected to the action of an agent capable of substantially stopping the etching action.

With this improved method, the openings have greater uniformity in opening size at the smaller ends. The smaller ends are all situated on the surface that is subjected to the agent for arresting the action of the etchant and they taper continuously toward a larger diameter on the opposite surface. Since the action of the etchant is substantially arrested at the smaller ends of the tapered openings, any difference in rate of etching along different paths is compensated for and all holes are of uniform diameter.

The present invention, together with further objects and advantages thereof, will be better understood from the following description taken in connection with the accompanying drawings and its scope will be pointed out in the appended claims.

In the drawings:

FIG. 1. is a composite view in perspective illustrating one method of bombarding, i.e., irradiating, a solid in sheet form with charged particles.

FIG. 2 is a fragmentary enlarged cross-sectional view of the bombarded sheet of FIG. 1 after it had been etched in a conventional manner by immersion in an etchant, showing the hourglass configuration of the resulting holes 13 in the sheet.

FIG. 3 is a cross-sectional view illustrating technique of carrying out the process of the present invention with an irradiated sheet prepared by the process of FIG. 1.

FIG. 4 is a fragmentary enlarged cross-sectional view of the irradiated sheet, after it had been etched as illustrated in FIG. 3, showing the tapered configuration of the resulting holes.

FIG. 5 is a cross-sectional view showing continuous etching of a flexible irradiated sheet according to the instant process.

FIG. 6 is a cross-sectional view illustrating another technique of carrying out the process of this invention.

In carrying out the instant invention, a solid is first irradiated with charged particles. One method of preparing the irradiated solid is shown in FIG. 1. A layer 11 of Californium-252 on substrate 10 emits fission fragments, i.e., heavy charged particles, which bombard sheet 12 and pass through it.

In accordance with the instant invention, the irradiated solid is etched to produce holes 18 of substantially uniform size having a tapered shape as illustrated in FIG. 4. This is accomplished by contacting one surface, preferably the bombarded surface, of the solid with etchant and the opposite surface with an agent which is capable of substantially stopping the etching action. Such an agent is a neutralizer for the etchant, or an inert medium such as water. The agent may be in liquid or gas form. The gaseous form of the inert medium includes gases such as nitrogen and helium. When a gas is used, its pressure should be above atmospheric and sufficient to substantially stop the etching action for a particular hole when it is formed.

The solid material used in the instant process can have any desired shape. For most applications, it is used in the form of a sheet. A solid which is thermoplastic should be formed into the desired shape by any conventional technique prior to bombardment. The specific thickness of the sheet depends somewhat on its final use. It need only be thick enough to form a continuous film, generally about one micron. Its maximum thickness is limited by the range of the bombarding charged particles, and the etchability of the solid itself as well as its track defining damaged portions. For a number of solids, the maximum thickness is about 20 microns.

Any bombarding procedure which will produce the desired tracks in the solid sheet can be used. The process can be carried out in air or in a vacuum. Ions and particles which are generated in beams such as argon and oxygen ions and alpha particles are preferred since they produce substantially aligned tracks in the solid sheet in air or in a vacuum. On the other hand, particles such as Uranium-235 or Californium-252 fission fragments are emitted in random fashion. Improved alignment can be obtained by disposing an aluminum sheet containing a multitude of apertures between the bombarding fission fragments and the sheet so as to allow passage only of substantially parallel particles.

The particular type of charged particles used to bombard the solid sheet will depend largely on the extent to which they form tracks of damaged material in the solid since some solids are more easily damaged than others. Fission fragments, and ions heavier than oxygen such as argon, will form tracks of damaged material in most solids. Oxygen ions are effective with polymers such as the polycarbonates, whereas alpha particles are operable with the more easily damageable polymers such as the cellulose esters.

The bombarded track containing solid is stable in that its track-defining damaged portions do not become repaired during storage. It can, therefore, be etched at any convenient time.

In carrying out the instant process, any technique can be used which maintains the etchant in contact with one surface of the irradiated solid and the neutralizer or inert medium with the opposite surface of the solid. The etchant etches along the tracks of radiation damaged material and, upon penetrating through the solid to form a hole, it contacts the neutralizer or inert medium and its etching action is stopped. This method is especially effective in the production of fine tapered holes of substantially uniform size. The diameter of the hole opening at the tapered end, i.e., narrowest portion of the tapered hole, may be about 50 Angstroms or lower depending largely on the material and specific etching procedure.

When the agent used to stop the etching action is in liquid form, an especially high degree of uniformity in hole structure is attainable by applying a positive gas pressure, i.e., a pressure above atmospheric, to the liquid agent. Upon the formation of a fine hole in the solid, the liquid agent, i.e., the neutralizer or inert medium, will then pass through the hole and substantially stop the etching locally. With a fine hole, however, the neutralizer or inert medium has no significant effect on the formation of neighboring holes, and therefore, the holes will have substantially the same tapered structure and size.

The etchant used to etch the irradiated solid along the tracks of damaged material and penetrate the solid to form a hole should not significantly affect the remainder of the solid. The particular etchant used and its concentration in solution depends largely on the etchability of the damaged material. Typical etchants include hydrofluoric acid, sodium hydroxide, potassium hydroxide and potassium permanganate. Specifically, a polycarbonate ("Lexan") would require a strong base such as sodium hydroxide as an etchant which is neutralized by an acid such as hydrochloric acid. Mica, on the other hand, would require an acid like hydrofluoric acid as an etchant for which a suitable neutralizer would be a base such as sodium hydroxide. It is assumed that the neutralizer has no significant effect on the solid being etched. The concentration of the neutralizer need only be sufficient to substantially stop the etching action of the etchant. For a number of etchants, water is effective in substantially stopping the etching action.

One method of carrying out the instant process is illustrated in FIG. 3. A chamber 14 is formed by affixing a stiff inert material 15 to the rim of the irradiated solid sheet 16 as shown in FIG. 3. Neutralizer is poured into chamber 14 and the entire structure is immersed in a bath of etchant 17. The etchant etches along the tracks of radiation damaged material and, upon penetrating through the solid to form a hole, the neutralizing agent in chamber 14, which may be a neutralizer for the etchant or an inert medium, passes through the newly formed hole. The specific inert material 15 used to form the chamber 14 would depend largely on the etchant and somewhat on the neutralizer. Representative of such inert materials is poly(methyl) methacrylate ("Lucite").

A continuous method of carrying out the present process with a flexible irradiated film 20 is shown in FIG. 5. Such a film is usually formed from a polymer. Between two layers of the film 20 there is sealed an absorbent 19 containing a neutralizer for the etchant. Representative of such an absorbent is regenerated cellulose. The resulting composite is passed by means of rollers 22 through the etchant bath 21. When the etchant penetrates through the irradiated film, it contacts the neutralizer in the absorbent and the etching action along the periphery of the hole is substantially stopped.

FIG. 6 illustrates another method of carrying out the instant invention with cell 23. The irradiated film 25 is affixed to the central portion of cell 23 with one surface of the film exposed to the etchant-containing portion 24 of the cell and the opposite surface of the film being exposed to the neutralizer or inert medium containing portion 26 of the cell. The cell portion 24 is filled with sufficient etchant to cover the surface of the film. The cell portion 26 is provided with an amount of liquid neutralizer or inert medium insufficient to contact the film surface. Vacuum means 27 evacuates cell portion 26 and converts the neutralizer or inert medium to a gas. The etchant etches along the tracks of radiation damaged material and upon penetrating through the film to form a hole, the neutralizer or inert medium, in gas form, permeates the hole and stops the etching action. When it is not desirable to convert the neutralizer or inert medium to a gas, cell portion 26 can be provided with liquid neutralizer in an amount sufficient to cover the surface of film 25. On the other hand, the neutralizer or inert medium may initially be used in gas form.

The products prepared by the process of the present invention are especially useful as filters, i.e., to separate molecules of different sizes such as proteins, high polymers, and viruses. In addition, they may be used for water purification and as a calibrated leak for vacuum systems. The tapered holes of the present product allow more fluid flow for a given limiting size.

The invention is further illustrated by the following examples.

Unless otherwise noted, holes in the solid sheets of the following examples were measured through a high powered optical microscope which was calibrated by looking at a finely ruled scale. All parts used herein are by weight unless otherwise noted.

In all of the following examples, the solid sheet was irradiated with Californium-252 fission fragments. The irradiation was carried out in a vacuum of about 1 cm. Hg. using a brass tube to prevent fragments having an angle less than 1½° normal to the sheet from bombarding the sheet.

EXAMPLE 1

Polycarbonate film ("Makrofol") having a thickness of about 8 microns was irradiated with fission fragments of Californium-252 for 15 hours to produce a track density of about $1 \times 10^6/cm^2$.

One sample of the film was etched by the technique shown in FIG. 3. The film was adhered by means of epoxy glue to a sheet of Lucite, and allowed to dry, to form the chamber 14 which was then filled with a 3.1N hydrochloric acid solution. This chamber was then immersed in a 3.1N sodium hydroxide solution. Both solutions were maintained at 80°C, and the etching was allowed to proceed for 60 minutes. At the end of this time, the etched film was removed, rinsed with water and dried.

The microscope showed holes running completely through the sheet. The diameter of the holes on the film surface which had been contacted with sodium hydroxide, i.e., etchant, measured approximately 2.5 microns, whereas the diameter of the holes on the film surface exposed to neutralizer measured approximately 13,000 Angstroms. A photograph of cross-section of the film showed the holes to have a tapered structure such as the holes 18, of FIG. 4.

The above process was repeated with another sample of the irradiated polycarbonate film but with the chamber 14 filled with 3.1N sodium hydroxide solution. The hole sizes of the resulting etched film were similar on both surfaces of the film and measured approximately 30,000 Angstroms.

EXAMPLE 2

Polycarbonate film ("Makrofol"), 11 microns thick, was irradiated with fission fragments of Californium-252 for 15 hours to produce a track density of about 1 × $10^6$ per $cm^2$. This film was etched by the technique shown in FIG. 3 except that chamber 14 was provided with an inert gas at above atmospheric pressure. The film was adhered by means of epoxy glue to a sheet of Lucite and allowed to dry to form the chamber 14. This chamber was then filled with nitrogen gas which was maintained at a pressure equivalent to 5 inches water in chamber 14 throughout the etching process.

The gas filled chamber was immersed in a 3.1N sodium hydroxide solution which was maintained at 80°C for 30 minutes. At the end of this time, the etched film was removed, rinsed with water and dried.

The microscope showed holes running completely through the sheet. The diameter of the holes on the film surface which had been contacted with sodium hydroxide, i.e., etchant, measured approximately 41,000 Angstroms while the diameter of the holes on the film surface exposed to the nitrogen gas measured about 18,000 Angstroms.

EXAMPLE 3

Polycarbonate film (Makrofol), about 10 microns thick, was irradiated with fission fragments to a track density of about 4 × $10^6$ per $cm^2$.

The irradiated film was etched by the technique illustrated by FIG. 6 using a cell formed from Lucite. The film was rinsed in absolute ethanol before being mounted in the cell with Viton "O" rings. The etchant portion 24 of the cell 23 was filled with a 3.1N sodium hydroxide solution while cell portion 26 was provided with a 6N hydrochloric acid solution in an amount which did not contact the film surface as shown in FIG. 6.

The cell portion 26 was partially exhausted to remove air. The exhausting operation was then stopped to permit hydrochloric acid vapor to achieve its equilibrium pressure. During etching, the entire cell was maintained at a temperature of approximately 80°C. At the end of 15 minutes, the etched film was removed, rinsed with water and dried.

The hole diameter on the film surface which had been contacted with the hydrochloric vapor, i.e., neutralizer, measured approximately 6,000 Angstroms whereas the hole diameter on the film surface which had been contacted with the sodium hydroxide solution, i.e. etchant measured about 26,000 Angstroms.

EXAMPLE 4

In this example a sheet of mica about 5 microns thick was irradiated with fission fragments of Californium-252 for 5 minutes to produce a track density of 6.57 × $10^4/cm^2$.

The mica sheet was etched using substantially the structure and technique of FIG. 6 except that cell portion 26 was filled with a liquid diluent, i.e., a 1N aqueous potassium chloride solution, to cover the surface of the mica sheet. Cell portion 24 was filled with an 8.5 percent hydrofluoric acid solution. The mica sheet was etched for 100 minutes. At the end of this time, the etched sheet was removed, washed with water and dried.

In this example, the diameter of the holes was inferred from measurements of the electrical resistance of the pores as etching proceeded coupled with the known etching rate of the irradiated mica in 8.5 percent hydroflouric acid at 25°C. The hole diameter on the mica surface which had been contacted with the diluent inferred to be about 50 Angstroms whereas the hole diameter on the mica surface contacted with the hydrofluoric acid solution inferred to be about 1,200 Angstroms.

What is claimed is:

1. A process for making tapered holes of substantially uniform size in a sheet of a nonmetallic solid having a thickness ranging from 1 to 20 microns to produce an article useful as a filter for separating molecules of different sizes which comprises bombarding a side of said sheet with charged particles to produce substantially straight charged particle tracks of damaged material extending through said sheet from the bombarded side through the opposite side, affixing separating means along the periphery portion of said sheet to separate the two sides of said sheet, contacting one side only of the bombarded sheet with an etchant fluid which etches and removes said tracks of damaged material, contacting the opposite side only of said sheet with a neutralizing agent prior to the formation of etched holes through said sheet by said etchant fluid, said neutralizing agent for said etchant fluid being selected from the group consisting of an inert liquid, a neutralizing liquid, and neutralizing gas, allowing said etchant fluid to etch and remove said tracks of damaged material to form holes therethrough whereupon its etching action in each just-formed hole is stopped by said neutralizing agent in contact with said opposite side of said sheet, said separating means being such as to separate said etchant fluid from said neutralizing agent so that the only contact therebetween is through said etched holes.

2. A process for making tapered holes of substantially uniform size in a sheet of a non-metallic solid according to claim 1 wherein said sheet is formed from a synthetic polymer.

3. A process for making tapered holes of substantially uniform size in a sheet of a non-metallic solid according to claim 1 wherein said etchant fluid is selected from the group consisting of hydrofluoric acid, sodium hydroxide, potassium hydroxide and potassium permanganate.

4. A process for making tapered holes of substantially uniform size in a sheet of a non-metallic solid according to claim 1 wherein a pressure higher than atmospheric pressure is applied to said agent.

5. A process for making tapered holes of substantially uniform size in a solid sheet of polycarbonate ranging in thickness from about 1 to 20 microns to produce an article useful as a filter for separating molecules of different sizes which comprises bombarding a side of said sheet with fission fragments to form charged particle tracks of radiation damaged material extending through said sheet from the bombarded side through the opposite side, affixing separating means along the periphery portion of said sheet to separate the two sides of said sheet, contacting one side only of said bombarded sheet with an etchant fluid which etches and removes said tracks of damaged material, contacting the opposite side only of said sheet with a neutralizing agent prior to the formation of etched holes through said sheet by said etchant fluid, said neutralizing agent for said etchant fluid being selected from the group consisting of an inert liquid, a neutralizing liquid, and neutralizing gas, allowing said etchant fluid to etch and remove said tracks of damaged material to form holes therethrough whereupon its etching action in each just-formed hole is stopped by said agent in contact with said opposite side of said sheet, said separating means being such as to separate said etchant fluid from said neutralizing agent so that the only contact therebetween is through said etched holes.

6. A continuous process for forming small tapered holes of substantially uniform size in two flexible sheets of synthetic polymer wherein each sheet ranges in thickness from about 1 to 20 microns to produce an article useful as a filter for separating molecules of different sizes which comprises bombarding a side of each sheet with fission fragments to produce substantially straight charged particle tracks of radiation damaged material extending through each sheet from the bombarded side through the opposite side, placing an absorbent material containing a liquid neutralizer between said two sheets to form a composite, passing the composite through an etchant fluid which etches and removes said tracks of damaged material, and allowing said etchant fluid to etch and remove said tracks of damaged material to form holes therethrough whereupon its etching action in each just-formed hole is stopped by said liquid neutralizer.

7. A continuous process according to claim 6 wherein said synthetic polymer is a polycarbonate.

* * * * *